S. GRAHAM.
Gang Plow.
No. 80,405.
Patented July 28, 1868.
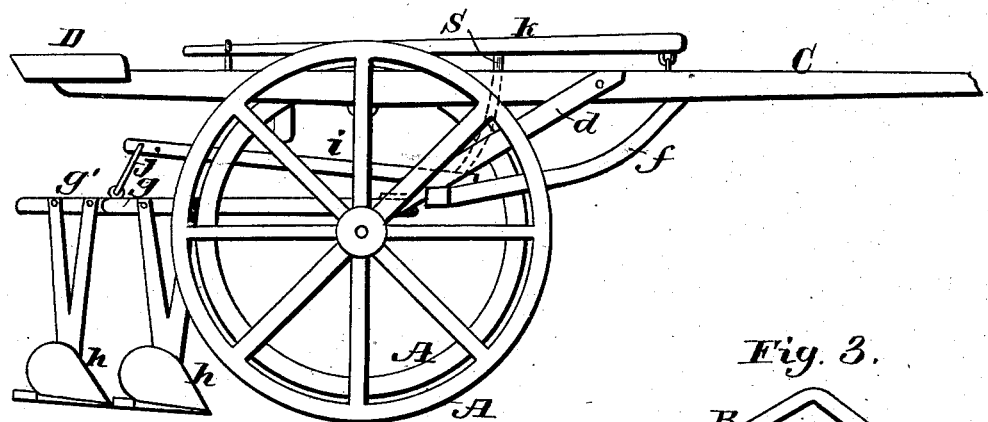
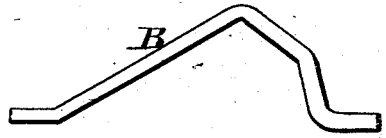
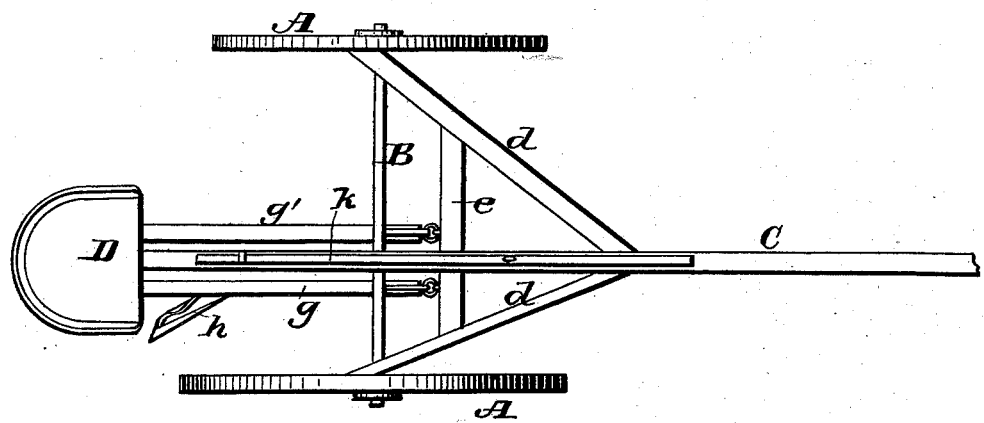
Witnesses:
J. Alfred Ellis
J. W. Mister
Inventor:
S. Graham
per
F. A. Alexander
Atty

United States Patent Office.

SMITH GRAHAM, OF FENNIMORE, WISCONSIN.

Letters Patent No. 80,405, dated July 28, 1868.

IMPROVEMENT IN GANG-PLOW.

*The Schedule referred to in these Letters Patent and making part of the same.*

TO ALL WHOM IT MAY CONCERN:

Be it known that I, SMITH GRAHAM, of Fennimore, in the county of Grant, and State of Wisconsin, have invented certain new and useful Improvements in Gang-Plows; and I do hereby declare that the following is a full, clear, and exact description thereof, reference being had to the accompanying drawings, and to the letters of reference marked thereon, which form a part of this specification, in which—

Figure 1 represents a side elevation of my gang-plow, and

Figure 2 a plan view of the same.

Figure 3 is a view of the axle detached.

The nature of my invention consists in constructing and arranging the lever $k$, bar $i$, and hinged beams $g$ and $g'$ in the manner and for the purpose hereinafter set forth.

To enable others to make and use my invention, I will now describe its construction and operation.

In the accompanying drawings, A A represent the wheels of my machine, and B the axle, which is curved in the manner shown in fig. 3.

C designates the tongue, which rests on the top of axle B, a little to the right of the centre, and is strengthened by the braces $d\ d$, the inner ends of said braces being bolted to axle B near the wheels.

$e$ represents a cross-bar, bolted to the under side of the braces $d\ d$.

Attached to bar $e$ is an additional brace, $f$, which extends forward, being fastened securely to the bottom of tongue C.

$g\ g'$ designate two parallel beams, of unequal length, framed at a suitable distance apart, and hinged to the cross-bar $e$.

To the outer end of each beam a shovel, $h$, is attached, the shovel on beam $g$ being in advance of the one on beam $g'$.

$i$ represents a bar, pivoted to a pendant under tongue C.

The outer end of bar $i$ has a metal rod, $j$, passing through it, and bent downwards, and attached at its ends to the beams $g\ g'$.

$k$ represents a lever, the front end of which is hinged to the top of tongue C, and extending back within a short distance of the driver's seat, D. The driver's seat, it will be observed, is located on the outer end of the tongue, directly over the shovels of the beams $g\ g'$, so as to cause the weight to fall thereon.

Near the centre of lever $k$ is fastened a slightly-curved bar or metal strip, $s$, which passes down through a mortise in tongue C, and fastened, at its lower end, to bar $i$.

By acting on the end of lever $k$, next to the driver's seat, the beams $g\ g'$, with plows attached, can be raised or lowered, in the following manner: By pressing lever $k$ down, the inner end of bar $i$ will be lowered, and the outer end, with the two beams attached to it, will be elevated, and by raising the long arm of lever $k$, the beams and plows will be lowered.

Having thus described my invention, what I claim as new, and desire to secure by Letters Patent, is—

The hinged-framed beams $g\ g'$, bar $i$, lever $k$, link $j$, and metal strip or bar $s$, all combined and arranged substantially as and for the purpose described.

In testimony that I claim the foregoing as my own, I affix my signature in presence of two witnesses.

SMITH GRAHAM.

Witnesses:
  JAMES H. ASHMORE,
  DAVID WINTER.